UNITED STATES PATENT OFFICE.

CHARLES J. BRUCE, OF BOSTON, MASSACHUSETTS.

PAINT COMPOUND.

SPECIFICATION forming part of Letters Patent No. 632,095, dated August 29, 1899.

Application filed February 20, 1899. Serial No. 706,104. (No specimens.)

*To all whom it may concern:*

Be it known that I, CHARLES J. BRUCE, of Boston, in the county of Suffolk and State of Massachusetts, have invented certain new and useful Improvements in Paint Compounds, of which the following is a description sufficiently full, clear, and exact to enable those skilled in the art to which it appertains or with which it is most nearly connected to make and use the same.

This composition for a flexible and elastic paint for the surfaces of wood, iron, tin, stone, plaster, canvas, &c., consists of the following ingredients, combined in substantially the following proportions—namely, four pounds sulfate of zinc (crude) dissolved in one gallon of water, one gallon paint composed of a suitable pigment and oil-vehicle, one ounce glucose, one-quarter ounce dextrin, one-quarter ounce paraffin-wax, two ounces spirits of turpentine, and one-eighth ounce citronella. These ingredients are prepared and compounded by dissolving the crude sulfate of zinc and dextrin in one gallon of soft hot water, which is allowed to stand until the sediment contained therein settles at the bottom, when the clear solution is poured into another vessel for use, the sediment being unused. This clarified solution is slowly stirred into the one gallon of ordinary oil-paint until the two are perfectly combined. The paraffin-wax is then dissolved in the spirits of turpentine by agitating them together in any suitable way, as by shaking them in a bottle, and these ingredients are then mixed with the glucose and citronella and subsequently thoroughly stirred into the partially-prepared paint mixture.

I am aware that it has been proposed to mix a watery solution of the sulfate of zinc with oil-paints and that it is old to add glucose and dextrin to paint mixtures, but this I disclaim, broadly, since none of the compounds using ingredients of the kind mentioned, so far as I am aware, constitute a mixture capable of producing a paint having the high degree of flexibility and elasticity which my paint possesses and which results from the composition of the ingredients pointed out by me and which are combined substantially as specified.

Before applying the paint the surface may be treated with any suitable priming, and when the paint has been applied and becomes dry it may, if desired, be "decorated" on its surface and the whole covered with any suitable transparent varnish or other suitable "finish."

This paint has been found to be flexible and elastic to quite an appreciable extent, and yet to well withstand such exposure as that to which paints are commonly subjected.

The glucose, paraffin-wax, and dextrin are added to the compound in order to temper it, as it were, to suit different conditions—that is, to make enduring and serviceable under varying conditions of heat, cold, moisture, &c.—and these ingredients have been found useful and necessary from practical experience.

Having thus fully ascertained the nature of the invention and the manner of compounding it, it is declared that what is claimed is—

The herein-described composition of matter, forming a flexible and elastic paint, consisting of clarified solution sulfate zinc (crude), solution of dextrin, water, oil-paint, glucose, paraffin-wax, spirits of turpentine, and citronella, in substantially the proportions specified.

In testimony whereof I have signed my name to this specification, in the presence of two subscribing witnesses, this 30th day of January, A. D. 1899.

CHARLES J. BRUCE.

Witnesses:
JOHN A. BROWN,
A. LOUISE COLLINS.